| United States Patent [19] | [11] | 4,140,748 |
|---|---|---|
| Oré | [45] | Feb. 20, 1979 |

[54] HEMIHYDRATE TYPE PHOSPHORIC ACID PROCESS WITH CRYSTAL MODIFIER

[75] Inventor: Fernando Oré, Whittier, Calif.

[73] Assignee: Occidental Petroleum Corporation, Los Angeles, Calif.

[21] Appl. No.: 703,139

[22] Filed: Jul. 7, 1976

[51] Int. Cl.² ............... C01B 25/16; C01F 1/00; C01F 5/00; C22B 26/20

[52] U.S. Cl. ........................ 423/167; 423/266; 423/320

[58] Field of Search ............ 423/167, 266, 319, 320, 423/555

[56] References Cited

U.S. PATENT DOCUMENTS

| 2,968,544 | 1/1961 | Zeitz et al. | 423/320 |
|---|---|---|---|
| 3,192,014 | 6/1965 | Leyshen et al. | 423/266 |
| 3,197,280 | 7/1965 | Boyle et al. | 423/320 |
| 3,418,077 | 12/1968 | Robinson | 423/167 |
| 3,522,003 | 7/1970 | Lopker | 423/167 |
| 3,522,004 | 7/1970 | Lopker | 423/167 |
| 3,594,123 | 7/1971 | Encke et al. | 423/320 |
| 3,653,827 | 4/1972 | Hey et al. | 423/320 |
| 3,796,790 | 3/1974 | Sirianni et al. | 423/319 |

OTHER PUBLICATIONS

Phosphoric Acid–Slack–1968–pp. 279 to 284 and 383 to 386.
Chemical Industries–vol. 64–5/49–"Chemical Antifoaming Agents", by Ross–pp. 757-759.

Primary Examiner—O. R. Vertiz
Assistant Examiner—Eugene T. Wheelock
Attorney, Agent, or Firm—Barry A. Bisson; Edward A. Grannen, Jr.; W. G. Lane

[57] ABSTRACT

Phosphate rock and sulfuric acid are reacted to produce phosphoric acid and calcium sulfate by means of the hemihydrate wet process. In this improved process, the calcium sulfate hemihydrate is crystallized from solution in the presence of an organic sulfonic acid or a derivative thereof. The organic sulfonic acid or its derivative improves the growth of the calcium sulfate hemihydrate crystals and thus improves the filtration rate of the slurry produced in this improved process.

6 Claims, No Drawings

HEMIHYDRATE TYPE PHOSPHORIC ACID PROCESS WITH CRYSTAL MODIFIER

SUMMARY

The present invention is directed to an improved process for the manufacture of phosphoric acid by the wet process. The hemihydrate or as it is sometimes called the semihydrate process is employed to produce wet process phosphoric acid from phosphate rock and sulfuric acid, the improvement being the presence of organic sulfonate materials during the crystallization of the calcium sulfate hemihydrate from solution. Phosphate rock and sulfuric acid are reacted within the slurry comprising sulfuric acid, phosphoric acid, monocalcium phosphate and calcium sulfate hemihydrate, therebeing present an organic sulfonate in said slurry which acts to increase the crystal growth of the calcium sulfate hemihydrate therepresent.

BACKGROUND

The present invention is directed to an improved process for the production of phosphoric acid by the wet process. The invention is directed to the production of phosphoric acid by the calcium sulfate hemihydrate or simply the hemihydrate process. The present invention is directed to a process in which organic sulfonate reagents are used to increase the crystal size of the calcium sulfate hemihydrate crystals formed during the production of phosphoric acid.

The hemihydrate wet process for the production of phosphoric acid is one of the processes used in the industry today. Other processes used are the gypsum, or the dihydrate process and the anhydrite process. All three prcesses are named from the by-product calcium sulfate produced during the production of phosphoric acid. The gypsum or dihydrate process is run at a temperature of 90° C. or less and a $P_2O_5$ concentration of about 30% in the liquid portion of the slurry. Increasing the temperature to about 90° to 120° C. and the $P_2O_5$ concentration from about 30 to 45% in the liquid phase will yield calcium sulfate hemihydrate. If, however, one chooses to run the phosphoric acid wet process at 130° C. and a $P_2O_5$ concentration greater than 30% than one obtains calcium sulfate anhydrite as the by-product. Advantages and disadvantages of each process are described in "Phosphoric Acid" Part One, edited by A. V. Slack, Marcel Dekker, Inc., New York, N.Y., 1968.

Phosphate rock and sulfuric acid are reacted with a slurry comprising phosphoric acid, sulfuric acid, monocalcium phosphate, and calcium sulfate hemihydrate. The temperatures and $P_2O_5$ concentrations are such that the main product from the reaction of the phosphate rock and the sulfuric acid will be calcium sulfate hemihydrate and phosphoric acid. Little, if any, calcium sulfate dihydrate will be observed in said reaction. The slurry so produced is then sent to a recovery section where the solids are separated from the liquid. This is usually done by means of a filter. The rate of filtration or the filterability of the slurry will be dependent among other things upon the size of the calcium sulfate hemihydrate crystals produced during the reaction.

The literature makes reference to the use of organic sulfonic acids and derivatives thereof as crystal growth modifiers to be used in wet process phosphoric acid processes, as agglomerating agents for use in wet process phosphoric acid slurries and as a reagent to moderate the conversion of calcium sulfate hemihydrate to calcium sulfate dihydrate or the reverse, namely the conversion of calcium sulfate dihydrate to calcium sulfate hemihydrate.

Slack (reference cited page 279) describes the use of a surface active agent in the dihydrate process, said surface active agent is used to promote the growth of small crystals. It appears as if the surface active agent in the dihydrate wet process acts as a nucleation poison to gypsum and reduces the number of gypsum nuclei formed, thereby favoring growth of large crystals and making the operation more difficult to upset by changes in conditions. The formation of larger crystals makes it easier to filter the slurry so formed. D. W. Leyshon et al, U.S. Pat. No. 3,192,014 describes a process for the preparation of phosphoric acid by means of the dihydrate wet process in which an additive selected from the group consisting of alkylbenzenesulfonic acids having an alkyl group from 9 to 12 carbon atoms, isopropylnapthalene sulfonic acid and the alkali metal salts of said acids are used to improve the filterability of the slurry produced. The additive is used from about 0.1 to about 3.2 pounds per ton of phosphate rock.

Slack (reference cited, page 383) describes the use of surface active agents in the hemihydrate wet process. Tests have shown that the formation of small unstable hemihydrate crystals as observed in previous processes, does not occur when a surface active agent or surfactant is added to the system. The surface active agent used was an alkylbenzenesulfonic acid.

A. F. Sirianni et al, U.S. Pat. No. 3,796,790 describes a process for the recovery of concentrated phosphoric acid from a suspension of gelatinous or finely divided precipitate such as the calcium sulfate in the process for producing phosphoric acid. The process involves treating the suspension with a particular surface active agent and a particular bridging liquid, said bridging liquid is a liquid hydrocarbon such as naphtha, kerosene, fuel oil, low viscosity processed oils, gas oils and petroleum aliphatic solvents. Agglomerates are formed when the suspension is vigorously mixed with the surface active agent and the liquid hydrocarbon. Said agglomerates are then removed by decanting, filtering, or centrifuging.

Several patents describe the recrystallization of calcium sulfate from one hydrate form to another. The patent issued to H. Akazawa et al, U.S. Pat. No. 3,645,677 is representative. Calcium sulfate hemihydrate is hydrated to calcium sulfate dihydrate in the presence of at least one surface active agent, selected from the group consisting of alkylaryl sulfonic acids, alkylnapthalene sulfonic acid, sulfuric acid esters of higher alcohols and salts thereof, and a mixed acid comprised of sulfuric acid and phosphoric acid from the ratio of about 0.4 or greater. Large, easily filterable purified calcium sulfate dihydrate crystals are prepared.

Other types of additives have been employed which aid in the growth of calcium sulfate crystals. Hey et al, U.S. Pat. No. 3,653,727, uses a mixture of an amide and a fatty acid as an anti-foam agent. The agent also improves the rate of calcium sulfate filtration.

DETAILED DESCRIPTION

This invention is directed to an improved process for the production of phosphoric acid by the calcium sulfate hemihydrate process.

Phosphate rock, either calcined or uncalcined, and phosphoric acid are added to a first slurry of calcium sulfate hemihydrate, monocalcium phosphate, phosphoric acid and sulfuric acid. Preferably, the phosphate rock is slurried in the phosphoric acid prior to the addition to the first slurry. Phosphate rock, about 95% of +100 mesh, containing at least 32% $P_2O_5$ is the preferred source of phosphate for the process. However, phosphate rock of 95% of −200 mesh can be used. Rock containing less than 32% $P_2O_5$ is acceptable, and can be employed in this process. High alumina phosphate pebble may also be used. The phosphate rock is slurried in phosphoric acid that contains from about 13% to about 47% $P_2O_5$. Phosphoric acid, recycled from the separation section, containing from about 13% to about 47% $P_2O_5$ is usually used in the process. However, phosphoric acid from other sources, such as other phosphoric acid plants or merchant grade acid may be used. When the phosphoric acid is recycled from the separation section it will usually contain from about 0.5 to about 3.5% free sulfuric acid.

The temperature of the phosphate rock-phosphoric acid mixture is maintained at about 50° C. to about 100° C., preferably from about 90° C. to about 100° C. The resulting mixture is from about 30% to about 40% solids by weight, about 33% being preferred. A defoamer is added if and when required.

The defoamer may be selected from the group consisting of tall oil fatty acids, oleic acid, sulfated tall oil fatty acids, sulfated oleic acid, silicones and mixtures of a monocarboxylic acid (12–22 carbon atoms) and monoalkanoylamide derivatives of the monocarboxylic acid. The preferred defoamer is produced and sold by AZ Products Co. of Eaton Park, Fla. and referred to as AZ 10A. The amount of the defoamer used is from about 0.05% to about 1.5% by weight based on the weight of the slurry transferred to the separation section.

The phosphate rock-phosphoric acid mixture is added to a first slurry of, calcium sulfate hemihydrate, phosphoric acid, monocalcium phosphate and sulfuric acid in a first reaction vessel. The phosphate rock and phosphoric acid may be added separately to the first slurry in the first reaction vessel. The phosphate rock-phosphoric acid mixture on being added to the first slurry in the first reaction vessel is immediately dispersed within the first slurry. A first portion of the second slurry from the second reaction vessel is added to the first slurry in the first reaction vessel. The second slurry which contains an excess of sulfuric acid is also immediately dispersed within the first slurry. A first portion of the first slurry is transferred to a second reaction vessel.

The first reaction vessel is fitted with a draft tube and an agitator. (The agitator consists of a shaft fitted with a propeller to the draft tube that on activation of the agitator, a second portion of the first slurry is drawn from the bottom of the draft tube up through the draft tube and out the top of the draft tube. On exiting the draft tube, said slurry passes in a downward direction in the space between the draft tube and the wall of the first reaction vessel. The direction of circulation through the draft may be reversed and is not critical. Circulation is thus established within the first reaction vessel. The rate at which said slurry is circulated is at least equal to about 50% of the volume of the slurry in the first reaction vessel per minute, preferably from about 50% to about 150% and most preferably about 100%. This circulation thoroughly disperses the phosphate rock-phosphoric acid mixture within the first slurry. The first slurry contains sulfuric acid which reacts exothermically with the phosphate rock being added. Dilution of the sulfuric acid also results in the evolution of heat. These exothermic reactions supply the heat required to maintain the temperature of the slurry in the first reaction vessel between about 66° C. to about 113° C. The soluble sulfate content of the first slurry is maintained at about +0.7% to about −4%. As measured, soluble sulfate values can be either positive or negative. Soluble sulfate values include not only the sulfuric acid present in the liquid component of the slurry but also the soluble calcium sulfate therepresent. Negative soluble sulfate values indicate that an excess of calcium ions are present in the solution as is usually observed in the phosphate rock-phosphoric acid mixture. Positive soluble sulfate values indicate that excess sulfate ions are present. A value of 0.0% soluble indicates that the sulfate ions and the calcium ions are equivalent stoichiometrically within the limits of the analysis. The residence time of the solids in the first reaction vessel is from about 2.0 hours to about 5.0 hours, preferably from about 2.5 hours to about 4.5 hours.

A first portion of the first slurry is transferred through a first conduit into a second reaction vessel. The second reaction vessel which can be subjected to a vacuum, is fitted with a draft tube, an agitator and a sulfuric acid inlet. The agitator consists of a shaft fitted with a propeller at the bottom thereof. The shaft and agitator are so located with respect to the draft tube that on actuation of the agitator a second portion of the second slurry is caused to flow from the bottom of the draft tube up through the draft tube and out the top of the draft tube. On exiting the draft tube, said second portion of the second slurry flows in a downward direction in a space between the draft tube and the inside walls of the second reaction vessel. The direction of the circulation can be reversed and is not critical. The rate at which the slurry is circulated is at least equal to about 50% of the volume of the slurry in the vessel per minute, preferably from about 50% to about 150% of the volume and most preferably about 100% of the volume. Sulfuric acid, preferably about 98%, is added through the sulfuric acid inlet into the second slurry either as is or mixed with phosphoric acid. The first portion of the first slurry is also added into the second slurry. A crystal modifier, usually an organic sulfonic acid or a derivative thereof, can be added to the slurry in the second reaction vessel. The crystal modifier can also be added to the first reaction vessel. The crystal modifiers are selected from the group consisting of alkyl, aryl, alkylaryl, and alicyclic derivates of sulfonic and sulfuric acids in which the organic radical contains from about 12 to about 30 carbon atoms. The free acid, salts thereof and mixtures of the free acid and salts may be used. The salts can be of alkali metals, ammonium, or of organic amines which contain from 1 to about 12 carbon atoms. Polymeric sulfonates and sulfates can also be employed. Examples of crystal modifiers which can be employed in the present process are alkyl sulfonic acids containing from about 12 to about 30 carbon atoms, benzenesulfonic acid, alkylbenzenesulfonic acid in which the alkyl group contains from about 8 to 20 carbon atoms, alkylcyclohexane sulfonic acid in which the alkyl group contains from about 8 to 20 carbon atoms, polymeric sulfonates and sulfates such as polystyrene sulfonate, and polyvinylsulfonate, said polymeric materials having a molecular weight of from about 500 to about 1,000,000. The crystal modifier is added for the purpose of increasing the growth of the hemihydrate crystals formed in the system. The flow of the second slurry within the second reaction vessel thoroughly disperses the first portion of the first slurry, the sulfuric acid and the crystal modifier within the second slurry. (The location of the sulfuric acid inlet in the second reaction vessel is not critical. It may be at the top, the middle, the bottom or at intermediate points of the second reaction vessel. The sulfuric acid conduit attached to the sulfuric acid inlet may enter the second reaction vessel from the top, the bottom or points intermediate therein, the exact point of entrance into the vessel is not critical.) Phosphoric acid, if needed, can be added to the second slurry within the second reaction vessel. The surface of the second slurry in the second reaction vessel is exposed to a pressure of between about 2 to about 29 inches of mercury absolute, preferably from about 3 to about 20 inches mercury absolute. Water and volatile components added to or produced in both the first and second slurries can be removed from the second slurry causing a reduction in the temperature of the second slurry from which the volatiles are removed. The cooled second slurry is thoroughly mixed so that temperature differentials are minimized within the total volume of the second slurry. With this evaporative cooling, the temperature of the second slurry is maintained between about 66° C. to about 113° C. preferably from 80° C. to about 105° C. [The process can be run while maintaining both the first and second reaction vessels at atmospheric pressure.] Sulfuric acid which is added to the second slurry in the second reaction vessel through the sulfuric acid inlet can be from about 89% to 99% $H_2SO_4$ or more, preferably about 98% $H_2SO_4$.

It has been determined that the total sulfate value added to the system is the sum of the sulfate values in sulfuric acid added plus the sulfate values added in the rock and this total is only about 90% to 100% of the stoichiometric amount of sulfate needed to convert the calcium added in the rock fed to the first reaction vessel into calcium sulfate hemihydrate. See Table 1 for the compilation of sulfuric acid usuage. Listed are the tons per day (TPD) of phosphate rock fed, % CaO in the rock, % $SO_4^{--}$ in the rock, CaO fed (TPD), stoichiometric sulfate for the calcium in the rock (TPD), sulfate in sulfuric acid fed to the unit (TPD), sulfate equivalent in the rock (TPD), the total used (TPD), and total sulfate used as a fraction of the stoichiometric amount of sulfate required for the calcium in the rock. The soluble sulfate content as measured in the second slurry should be from about +0.7% to about 4.5%, preferably from about 2.5% to about 3.5%; provided that when the soluble sulfate content of the first slurry is about +0.7% then the soluble sulfate content of the second slurry must be +1.0% or more. The specific gravity of the slurry in the second reaction vessel is about 1.80 ± .2 grams per cc. The specific gravity of the liquid portion of the slurry is about 1.56 ± 0.20 grams per cc. The liquid gravity corresponds to a phosphoric acid which contains about 42% ± 12% $P_2O_5$. Residence time of the phosphate values in the second reaction vessel is from about 0.6 hour to about 2.0 hours,

TABLE 1

| Rock Fed, TPD | CaO in Rock, % | $SO_4$ in Rock % | CaO Fed TPD | Stoichiometric Sulfate ($SO_4$) for CaO in Rock TPD | Sulfate Present in 100% $H_2SO_4$ Fed to Unit, TPD | Sulfate Equivalent in Rock, TPD | Total Sulfate Used, TPD | Total $SO_4$ used as a fraction Stoichiomet Amount |
|---|---|---|---|---|---|---|---|---|
| 1209.5 | 44.90 | 0.65 | 543.07 | 930.97 | 844.4 | 7.86 | 852.26 | 0.915 |
| 1383.1 | 45.97 | 0.65 | 635.81 | 1089.4 | 1052.2 | 8.99 | 1061.2 | 0.974 |
| 1381.6 | 46.76 | 0.65 | 646.04 | 1107.5 | 1024.7 | 8.98 | 1033.7 | 0.933 |
| 1172.2 | 46.81 | 0.65 | 548.71 | 940.64 | 844.3 | 7.62 | 851.9 | 0.906 |
| 1110.9 | 46.89 | 0.65 | 520.90 | 892.97 | 804.6 | 7.22 | 811.82 | 0.909 | preferably from about 0.7 hour to about 1.6 hours.

The excellent mixing obtained with this system is achieved using approximately 1/10 of the horsepower required for a comparable wet process phosphoric acid plant such as a Dorr-Oliver or a Prayon Plant.

A first portion of the second slurry flows from the second reaction vessel back to the first reaction vessel through a second conduit and is thoroughly dispersed within the first slurry. It is the flow of the second slurry to the first slurry which aids in maintaining the temperature of the first slurry and adds sulfate values (sulfuric acid) to the first slurry. Additional sulfate values are added to the first slurry in the first reaction vessel with the recycled phosphoric acid. Circulation between vessels and within vessel minimizes localized concentration of reactants of hot slurry and of cooled slurry thus resulting in a more easily controlled process than previously observed. A third portion of the second slurry is removed from the second reaction vessel and is transferred through a conduit to a reservoir. The third portion of the second slurry, on a weight basis, is approximately equal to the phosphate rock, the phosphoric acid, and the sulfuric acid added in the first and second reaction vessels respectively minus the volatiles (on a weight basis) removed from the second reaction vessel which (is) can be subject to a vacuum. The third portion of the second slurry is constantly stirred in the third vessel to prevent separation of the solids from the liquid and is maintained at about 66° C. to about 113° C., preferably from about 70° C. to about 100° C. The residence time in the third vessel is relatively short, being from about 0.5 hour to about 1.5 hours, preferably from about 0.60 hour to about 1.25 hours. The soluble sulfate concentration of the slurry in the third vessel may change somewhat due to continued reaction of the soluble sulfate values with any calcium values therepresent. Sulfuric acid may be added to the third vessel to adjust the sulfate values.

From the third vessel, the slurry is transferred to the separation section in which the slurry is separated into solid and liquid components using apparatus well known in the art.

Slurry samples are removed from the system at several locations. A sample port is placed in the first conduit at a location between the first and second vessels, the distance between the first and the second reaction vessel is not critical. Slurry removed from this sample port represents the first slurry. A sample port is located in the conduit between the second reaction vessel and the reservoir to which the third portion of the second slurry is pumped. The location of this sample port in terms of distance between the second reaction vessel and the reservoir is not critical. Slurry samples obtained from these two ports can be analyzed for soluble sulfate concentrations, specific gravities, and crystal size. The flow rates of the reactants and of the slurries are adjusted in accordance with the analytical values obtained in order to maintain the desired sulfate levels within the reaction system. It is to be understood that the system described can be run on a continuous basis, the reactants are continuously added and the third portion of the second slurry is continuously removed from the system prior to separation into phosphoric acid and calcium sulfate hemihydrate.

EXAMPLE 1

The first and second reaction vessels and the accompanying connective means such as conduits, pumps, etc., are filled with a slurry consisting of, calcium sulfate hemihydrate, monocalcium phosphate, phosphoric acid and sulfuric acid. The weight percent of the solids in the slurry is about 31%, the specific gravity of the slurry in the second reaction vessel is about $1.80 \pm 0.07$ g/cc and the specific gravity of the liquid portion of the slurry is about $1.53 \pm 0.06$ g/cc. The $P_2O_5$ concentration of the liquid portion of the slurry is about 42% by weight. The temperature of the slurry in the first reaction vessel is between about 88°–102° C. preferably between 92° and 105° C., whereas the temperature in the second reaction vessel is between 88° and 105° C., preferably between 92° C. and 105° C. Soluble sulfate concentration in the first reaction vessel is from about +0.7 to about −4% and the soluble sulfate concentration in the second reaction vessel is from about 0.7% to about +4.5%.

A mixture of phosphate rock (typical analysis shown in Table 2) of a size distribution shown in Table 3, and phosphoric acid is prepared by adding phosphate rock to phosphoric acid in the ratio of about 1647 pounds of phosphate rock (about 31.2 $P_2O_5$ and 45.6 CaO) to about 3700 pounds of phosphoric acid (about 32% $P_2O_5$). The temperature of the mixture is about 90° C. A defoaming agent is added as needed to reduce the foam caused by partial dissolution of the phosphate rock in phosphoric acid. The amount of defoamer varies from about 0.05% to about 1.5% based on the amount of phosphate rock added.

This phosphate rock-phosphoric acid mixture is added to the first slurry in the first reaction vessel at the rate of about 380 gpm (about 5350 pounds per minute). The incoming mixture is thoroughly mixed with the first slurry. Intra vessel mixing is accomplished by means of the draft tube and the agitator. The first slurry is pumped from the first reaction vessel to the second reaction vessel at the rate of about 1640 gallons per minute. The first slurry is thoroughly mixed with the second slurry and 98% sulfuric acid which is added to the second reaction vessel at about 87 gpm. An organic sulfonic acid derivative, a crystal modifier, can be added to the second reaction vessel in amounts from about 1 ppm to about 1000 ppm by weight based on the weight of the slurry transferred to the separation section where the solids are separated from the liquid portion of the slurry; 10 ppm being preferred. This material is added to promote the growth of the calcium sulfate hemihydrate crystals. The first slurry, the sulfuric acid and the crystal modifier are thoroughly dispersed into the second slurry in the second reaction vessel. The second slurry flows at the rate of about 1280 gallons per minute from the second reaction vessel into the first reaction vessel where it is thoroughly mixed with the first slurry.

About 45 gpm of water and volatile materials (HF, $SiF_4$, $H_2S$, $CO_2$, etc.) is vaporized from the second slurry in the second reaction vessel. The second reaction vessel is maintained under a pressure of about 15 inches of mercury absolute. Approximately 400 gpm of slurry is withdrawn from the second reaction vessel and flows to the separator feed tank. Thus about 445 gpm of material (vaporized material and the slurry to the separator feed tank) is removed from the system. The removed slurry is then passed to the separation section where the solid and liquid portions of the slurry are separated.

At these rates, the plant will produce about 350 tons per day of $P_2O_5$ of 35–44% $P_2O_5$ phosphoric acid. The recovery data is summarized below.

| TOTAL LOSS IN FILTER CAKE | |
|---|---|
| | % of $P_2O_5$ fed in rock |
| Citrate insoluble (CI) | 0.76 |
| Citrate soluble (CS) | 4.64 |
| Water soluble (WS) | 2.34 |
| Total loss | 7.74 |
| Total Recovery | 92.26 |

A typical analysis of the phosphoric acid produced by this process is shown in Table 4. The total resident time, from entering the first reaction vessel to exiting separation feed tank is calculated at 7.9 hours. The volume of the first reaction vessel is about 120,000 gallons, the volume of the second reaction vessel is about 40,000 gallons to normal liquid level.

EXAMPLES 2 to 7

The following system as described hereinafter was set up in the pilot plant to duplicate plant operation in order to investigate the effect of defoamers and crystal modifiers on the filterability, and hence the crystal size, of the calcium sulfate hemihydrate produced.

Into a first reaction vessel containing reaction slurry was added phosphate rock, recycled phosphoric acid and recycle reaction slurry from the second reaction vessel. Defoamer, when used, was added in the first reaction vessel. The reaction slurry so formed in the first reaction vessel was circulated to the second reaction vessel. Sulfuric acid and crystal modifiers were added to the second reaction vessel. Phosphoric acid could be added to the second reaction vessel if needed to control the viscosity of the reaction slurry. The second reaction vessel was maintained under vacuum so as to remove gaseous impurities and water from the slurry. The evaporative of water was utilized to cool the reaction slurry.

The conditions employed in determining the utility of the crystal modifier and the defoamer were standardized and are shown below in Table 5. Results of the tests are shown in Table 6.

Phosphate rock is present in the first and in the second slurries in the first and second reaction vessels respectively. The amount present is quite small and will vary considerably. The value for the "Citrate Insoluble" loss of the filter cake is a rough measure of undissolved and unreacted phosphate rock.

Table 2

| Typical Phosphate Rock Analysis | |
|---|---|
| Compound | % By Weight |
| $P_2O_5$ | 31.2 |
| CaO | 45.6 |
| $Fe_2O_3$ | 1.4 |
| $Al_2O_3$ | 1.2 |
| MgO | 0.4 |
| $SiO_2$ | 8.7 |
| F | 3.7 |
| $SO_3$ | 0.9 |
| $CO_2$ | 3.6 |
| Organic | 1.8 |
| $H_2O$ | 1.1 |
| $Na_2O, K_2O$ | 0.4 |

Table 3

| Typical Phosphate Rock Screen Analysis | |
|---|---|
| Mesh | Cummulative Percent |
| +14 | 0.4 |
| +24 | 2.6 |
| +28 | 9.3 |
| +35 | 26.6 |
| +48 | 64.1 |
| +65 | 86.4 |
| +100 | 97.7 |
| −100 | 2.3 |

Table 4

| Typical Phosphoric Acid Analysis | |
|---|---|
| $P_2O_5$ | 37.95% |
| $SO_4^=$ | 1.72 |
| CaO | 1.04 |
| $F^-$ | 1.27 |
| MgO | 0.46 |
| $Fe_2O_3$ | 0.97 |
| $Al_2O_3$ | 0.91 |

Table 5

| GENERAL REACTION CONDITIONS (Pilot Plant) | |
|---|---|
| Slurry Density | 1.72 g/cc |
| Sulfate Concentration | |
| First Reaction Vessel | −2% |
| Second Reaction Vessel | +2% |
| Phosphate Rock Feed Rate | 174 g/min. |
| Slurry Recycle From Second To First Reaction Vessel | 2200 g/min. |
| Recycle Phosphoric Acid Feed Rate to First Reaction Vessel | 390 g/min. |
| Sulfuric acid (93%) Feed Rate To Second Reaction Vessel | 150 g/min. |
| Defoamer Feed Rate to First Reaction Vessel | 0.7 - 1.1 g/min. |
| Crystal Modifier Feed Rate To Second Reaction Vessel (1% Soln of CM in Water) | 0.1 - 0.4 g/min. |
| Temperature of Slurry In Both Reaction Vessels | 195-205° F |

What is claimed is:

1. A process for the preparation of phosphoric acid from phosphate rock and sulfuric acid in which the phosphate rock and the sulfuric acid are reacted in a reaction section within a reaction slurry comprising phosphoric acid, sulfuric acid, monocalcium phosphate, and calcium sulfate hemihydrate to form a product slurry comprising phosphoric acid and calcium sulfate hemihydrate and said hemihydrate is separated from the product slurry in a separation section wherein the improvement comprises adding an organic sulfonate alkali metal salt to said reaction slurry in such an amount so as to increase the growth of the calcium sulfate hemihydrate crystals in the reaction section and further provide a concentration of about 1 to about 1000 ppm of said organic sulfonate alkali metal salt based on the weight of the reaction slurry transferred to said separation section and thereby improve the filtration rate therein.

2. The process according to claim 1 in which the organic sulfonate alkali metal salt added is selected from the group comprising alkali metal salts of alkyl, aryl, alkylaryl, alicyclic and alicyclicaryl sulfonic acids.

3. The process according to claim 1 in which the organic sulfonate alkali metal salt comprises sodium dodecyl sulfonate.

4. A process for the preparation of phosphoric acid from phosphate rock and sulfuric acid in which the phosphate rock and the sulfuric acid are reacted within a slurry comprising phosphoric acid, sulfuric acid, monocalcium phosphate, and calcium sulfate hemihydrate to form phosphoric acid and calcium sulfate hemihydrate wherein the improvement comprises adding to said reaction section an organic anti-foam agent selected from the group consisting of tall oil fatty acids, oleic acid, sulfated tall oil fatty acids, sulfated oleic acid, silicones, mixtures of monocarboxylic acids having 12-22 carbon atoms, monoalkanoylamid derivatives of said monocarboxylic acids, and sulfonated tall oil in an amount of from 0.05 to about 1.5% by weight based on the weight of the slurry to a separation section and also adding alkali metal salts of organic sulfonic acids and mixtures of said salts in an amount sufficient to provide a concentration of about 1 ppm to about 1000 ppm by weight, based on the weight of the slurry transferred to the separation section.

5. The process according to claim 4 in which the defoaming agent is a sulfonated tall oil.

6. The process of claim 4 wherein the alkali metal salt of organic sulfonic acid is selected from the group consisting of sodium dodecylsulfonate and sodium dodecylbenzene sulfonate.

Table 6

| Example | Defoamer Type | Defoamer Amount | Crystal Modifier Type | Crystal Modifier Amount | Filter Rate TON $P_2O_5/ft^2$-Day | Calcium Sulfate Hemihydrate Crystal Size (microns) |
|---|---|---|---|---|---|---|
| 2 | None | None | None | None | 0.30 to 0.35 | 10-15 |
| 3 | None | None | Actrasol W-40 | 10ppm | 0.70 to 0.90 | 30-45 |
| 4 | None | None | Actrasol W-40 | 100ppm | 0.45 to 0.55 | 20-30 |
| 5 | AZ10A | 0.46% | None | None | 0.40 to 0.50 | 20-30 |
| 6 | AZ10A | 0.46% | Actrasol W-40 | 10ppm | 0.80 to 1.10 | 60-90 |
| 7 | AZ10A | 0.46% | Conoco | 10ppm | 0.60 to 0.70 | 25-35 |

Actrasol W-40 - primarily sodium dodecylsulfonate, Arthur C. Trask Corp., Summit. Ill. 60501
AZ10A AZ Products Co., P.O. Box 67, Eaton Park, Florida 33840
Conoco c-560 - primarily sodium dodecylbenzene sulfonate, Continental Oil Co., Ponca City, Oklahoma